United States Patent Office 3,472,040
Patented Oct. 14, 1969

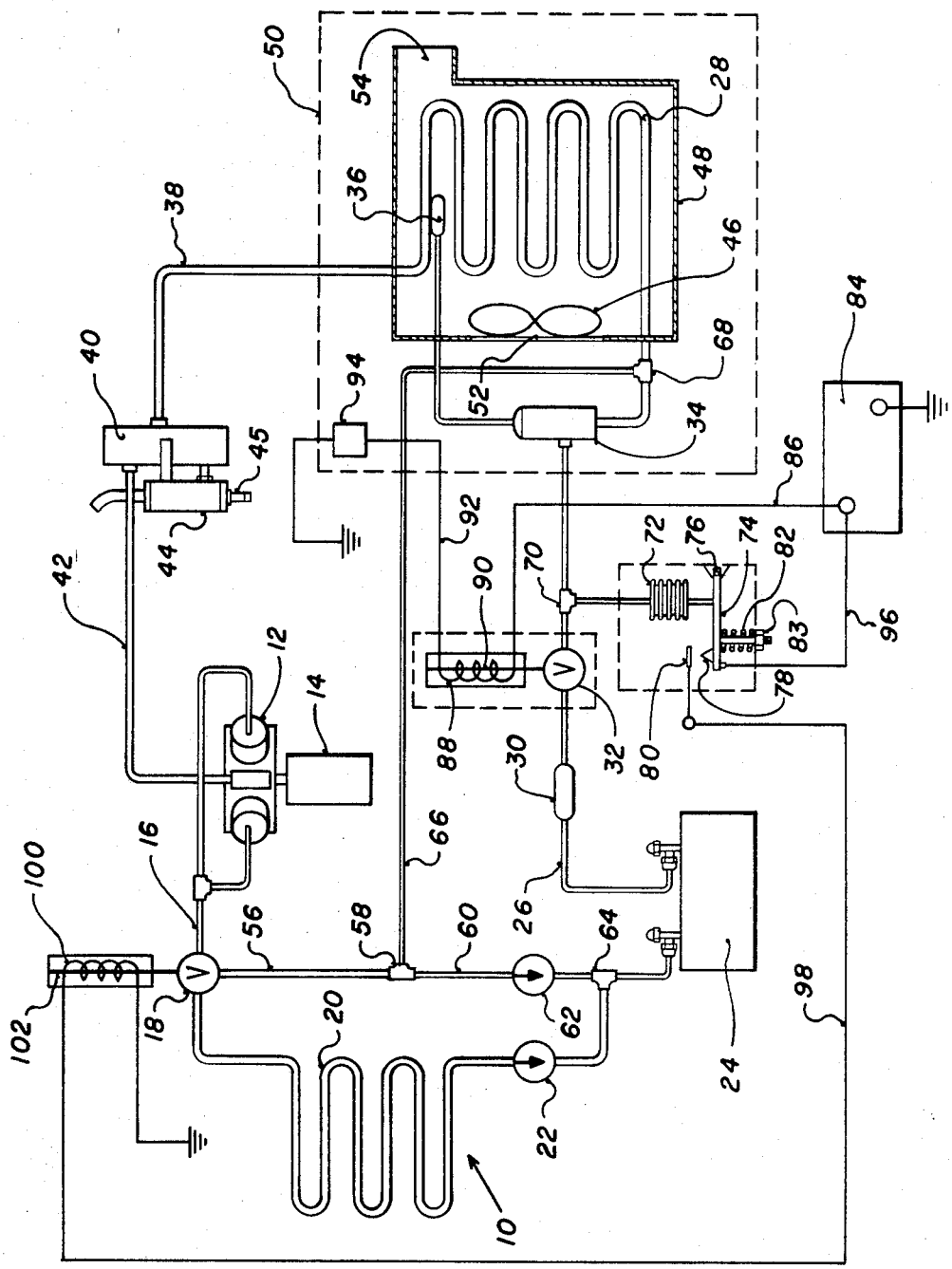

3,472,040
CONTROLLING ATMOSPHERIC CONDITIONS
David H. Taylor, Minneapolis, Minn., assignor to Thermo King Corporation, Minneapolis, Minn., a corporation of Delaware
Filed July 3, 1967, Ser. No. 650,813
Int. Cl. F25b *13/00, 41/04*
U.S. Cl. 62—117                                              5 Claims

ABSTRACT OF THE DISCLOSURE

The temperature and/or humidity within an enclosure may be controlled by alternately cooling and heating the space, but in which the extent of the heating phase of the cycle is limited and controlled.

---

This invention relates to improvements in a method and means of controlling atmospheric conditions within an enclosure. In general, the invention is concerned with controlling the temperature and/or humidity within an enclosure used for the preservation of perishable commodities, and more particularly when such goods are being transported for substantial periods of time.

Although it is customary to store or transport perishable commodities in enclosures which are refrigerated, and which are also insulated, variations in weather conditions can affect the atmospheric conditions within the enclosure, and this is particularly true in the instance of an insulated carrier. When goods are transported for considerable distances, either by land or by sea, they will pass through zones where temperature and humidity conditions are very likely to change, and thereby affect the conditions in the cargo carrying space.

It is known in the prior art to provide a method and means of maintaining a substantially constant temperature within an enclosure used to transport perishable products, and one example is found in the disclosure of U.S. Patent 2,992,541, assigned to the present assignee. According to that patent, the enclosed space is cooled to a predetermined minimum temperature, and then the system is modified to raise the temperature within the controlled space. By this arrangement of alternate heating and cooling, proper compensation can be had without regard to the ambient temperature, for if the ambient temperature is high, the system continues to cool sufficiently to compensate for heat leakage into the enclosure, whereas if the ambient temperature is excessively cool, the heating phase of the cycle will add sufficient heat to compensate for heat losses from the enclosure.

While the system described above will maintain a reasonable uniform temperature, there may be conditions under which improvements are desired, as for example, when the cargo space within the enclosure has been charged with an artificial atmosphere, such as nitrogen. It is well known that many forms of food products undergo respiration, and in some instances, the intake of oxygen from ordinary air is undesirable, and in such circumstances, an artificial atmosphere is used. In the alternate heating and cooling that occurs in the manner previously described, the heating cycle causes an expansion of the internal atmosphere, thereby producing leakage at doors, drain tubes or other openings in the enclosure. Then, when the unit switches to cooling the internal atmosphere contracts and sucks in outside air to replace the nitrogen or other gas that was lost in expansion. Hence, if an artificial atmosphere is used, the alternate heating and cooling thereof will soon bring into the enclosure undesired atmospheric air.

Another condition where the normal heating and cooling, as previously described, may be undesirable, is in the instance where temperature change to commodities close to the heat exchanger may be harmful. It will be recognized that with alternate heating and cooling, the portion of the goods which is located in close proximity to the heat exchange element may be subjected to a greater range of temperature change than those goods which are more distantly located from the heat exchanger. With some products, such a degree of temperature variation may result in dehydration of the product.

A further condition that may be undesirable can occur where the goods are of a nature such that they can be injured by the presence of an excessive amount of humidity. Some forms of meat products will not tolerate an excessive amount of moisture, and when that condition exists, an undesirable slimy surface may be formed on the product.

An object of the inventory is to provide a method of controlling a condition of the atmosphere within an enclosed space by controlling the rate of heating of said enclosed space in a system which continuously and alternately heats and cools the space to approximate a desired temperature therein.

Another object is to so reduce the heating effect in a system designed to alternately heat and cool an enclosed space to the extent that the heating is negligible and has substantially the same effect as shutting the system off during that portion of the alternate action devoted to heating.

Another object is to control the humidity conditions within an enclosed space by the use of a system designed to alternately cool and heat the space, and wherein the heating step has the additional effect of accentuating the cooling step to remove moisture from the atmosphere.

Other and further objects may become apparent from the following specification and claims, and from the appended drawing, in which the single figure is a schematic diagram of a refrigeration system and controls embodying one form of the present invention.

Referring now to the single figure of the drawing, the structure forming the apparatus of this invention will be described in detail.

General reference numeral 10 indicates in its entirety a refrigeration system. The system includes a compressor 12 driven by a prime mover 14, which may be either an electric motor or an internal combustion engine. Extending from the high pressure side of the compressor 12 is a conduit 16 which extends to a condenser 20 and contains a three-way valve 18. The discharge side of condenser 20 contains a check-valve 22 and extends to a receiver 24. A conduit 26 extends from receiver 24 to an evaporator 28 and contains a dehydrator 30, a valve 32, and at the juncture between conduit 26, and the evaporator coil 28, is a thermostatic valve 34 which is controlled by a thermostatic element 36 that is in thermal contact with a portion of the evaporator 28. A conduit 38 extends from the outlet end of the evaporator coil 28 to an accumulator 40, and the output side of the accumulator 40 is connected by a conduit 42 which extends to the low pressure side of compressor 12. Operably associated with the accumulator 40, for the purpose of evaporating any liquid refrigerant that may be present in the accumulator, is a source of heat herein indicated as an engine muffler 44, which through a pipe, a portion of which is indicated at 45, extends from the prime mover 14. Thermostatic control means operably connect the muffler 44 with the accumulator 40 to control the heating of the accumulator 40, and hence the rate of evaporation of refrigerant, as disclosed in my prior Patent 3,219,102.

The condenser 20 and evaporator 28 are each schematically disclosed as composed of a single coil, while in practice they are, in fact, composed of many coils, and may be disposed as a unitary structure divided by an insulated wall, as shown in U.S. Patent 2,336,735. The evaporator coil 28 has associated with it a fan or blower 46, and these two structures are disclosed within a casing 48 disposed within an insulated enclosure 50. The casing 48 has an inlet opening 52 whereby the fan 46 draws air from within the interior of the enclosure 50 and discharges the same into thermal contact with evaporator 28, and thence back to the interior of enclosure 50 through an outlet opening 54.

A conduit 56 extends from valve 18 to a T 58. From one side of T 58 a conduit 60, containing a check valve 62, extends to a T 64 interposed in the discharge side of condenser 20. From the T 58, a conduit 66 extends to a T 68 disposed adjacent the inlet end of evaporator 28, and beyond the thermostatic valve 34.

Interposed in the conduit 26, between valve 32 and the expansion valve 34, is a T 70 which extends to a pressure responsive motor 72, here disclosed as a bellows, whose interior is in communication with the conduit 26, and responsive to the pressure therein, in contrast to atmospheric pressure on the outside of the bellows. The pressure motor 72 is joined to a switch arm 74, which is pivoted at 76 and has a contact 78 that moves relative to a contact 80. Movement of the pressure motor 72, and hence the switch arm 74 is subject to control by a spring 82, whose pressure is made adjustable by an adjusting member 83.

An electrical system is provided for operating certain control portions of the system, and these include a source of power, indicated by battery 84, from which a conductor 86 extends to a coil 88 surrounding an armature 90 that actuates valve 32. From the coil 88, a conductor 92 extends through a thermostatic switch 94 to ground. The switch 94 is located within the enclosure 50, and is of the type whose contacts close on a temperature drop within the enclosure 50 to energize the armature 90 and move the control mechanism of valve 32 to a closed position to thereby terminate the flow of refrigerant fluid through conduit 26 between receiver 24 and the evaporator 28. A second conductor 96 extends from battery 84 to contact 78. A conductor 98 extends from contact 80 to a coil 100 that surrounds an armature 102 which is connected to the actuating member of valve 18.

The operation of the system herein described will now be explained. It may be assumed that the prime mover 14 is in operation, and is continuously driving the compressor 12. Assuming further that the temperature within enclosure 50 is above a predetermined desired temperature, the refrigeration system is operating in its normal refrigerating cycle. Refrigerant fluid flows from the receiver 24 through the conduit 26 to and through the dehydrator 30, valve 32, valve 34 into the evaporator 28, where it evaporates, drawing heat from the space. Thence the vapors return through conduit 38, accumulator 40, conduit 42 to the compressor. The compressed fluid flows through conduit 16, passing through valve 18 to the condenser 20 and hence through the check-valve 22 and T 64 to the receiver 24.

After the space within the enclosure 50 is cooled to the desired temperature, the contacts of thermostat 94 close to complete a circuit from battery 84 to ground, which energizes the solenoid valve 32, moving the same to a closed position, and thereby terminating the flow of refrigerant fluid in the normal course to the evaporator 28. With the fluid circuit blocked by the valve 32, the continuously operating compressor removes refrigerant from the evaporator 28, progressively diminishing the pressure in the system on the side beyond valve 32. The pressure motor 72 has up to this time been subjected to the higher pressure within the refrigerant system in contrast to the lower pressure of atmosphere, but as the internal pressure continues to diminish, and under the influence of the spring 82, the pressure motor 72 will contract until the switchblade 74 brings contact 78 into engagement with contact 80. When this occurs, a second circuit is closed between the battery 84 and the electrical motor 100, 102, that actuates valve 18, and the actuation of this valve cuts off the flow of the compressed refrigerant from conduit 16 to the condenser 20, and diverts this flow through the conduit 56 to the T 58. and because of the low pressure in the evaporator, all of the flow will be diverted through conduit 66 to the evaporator, and thence through the return conduits 38 and 42 to the compressor. The action of by-passing the compressed refrigerant to the evaporator will cause a heating of the evaporator to the extent of the energy transferred to the refrigerant fluid by the compressor. The degree or rate of heating produced by this arrangement is proportional to the amount of refrigerant that is undergoing circulation. Thus, if a substantial quantity of refrigerant has been removed from the circuit before the modification in the flow path caused by the actuation of valve 18, there will be a diminished quantity of fluid circulating through the system, and therefore, only a limited amount of heating will occur. The system continues to operate in this manner until the heat given off by the evaporator 28 is sufficient to raise the temperature in the controlled space 50 to a point where the contacts of thermostat 94 are opened. When the thermostat 94 opens, the circuit is broken to valve 32, which opens under the influence of a spring (not shown) and permits flow of refrigerant fluid through conduit 26 to the evaporator 28 to raise the pressure sufficient to break engagement between the contacts 78 and 80, and reinitiate the refrigerating cycle.

The system is subject to control by the adjustment of the member 83 relative to spring 82. By increasing the pressure on spring 82, the sensible heat within the system can be increased and will cause a longer running of the system on the refrigeration cycle which, in turn, will cause moisture to condense or freeze on the evaporator coil for disposition in a subsequent defrosting operation.

It follows from the foregoing discussion taken in conjunction with the description that the system tends, with a continuously operating system, to maintain a substantially constant temperature within the enclosed space by intermittent cooling operations separated by periods of slight heating, which are sufficient to aid in moisture control, as well as temperature control. This system is considerably different from merely shutting down the refrigeration system when a desired temperature is reached, because it permits continuous circulation of the atmosphere, and it also provides humidity control.

The invention is defined in the appended claims.

I claim:

1. In a process of heat exchange between an external environment and the space within an enclosure which embodies:

disposing a closed circuit heat transfer system, including a compressor, condenser, receiver and evaporator, said system having a first portion to include said evaporator located in heat exchange relationship with the space within said enclosure and a second portion to include said condenser located in heat exchange relationship with said external environment;

passing a heat exchange fluid through said first portion of said system at temperatures alternately above and below the space temperature in response to a condition of the atmosphere within said enclosure;

the improvement of progressively reducing the quantity of said fluid which is circulated within said first portion of said system when the temperature of said fluid within said first portion is above the space temperature and when no further heat transfer to said space is required by the condition of the atmosphere within said enclosure until the quantity of said fluid which remains in circulation in said system is the minimum necessary to maintain an operative condition of said system including said compressor;

isolating in said receiver and condenser by the sequential operation of valves that portion of said heat exchange fluid which is not maintained in circulation in said system;

and circulating the reduced quantity of said fluid through a portion of said system including said compressor and evaporator, the reduced quantity of fluid thereby providing negligible heat transfer to the space until the condition of the atmosphere within said enclosure which controls the system varies from a predetermined condition.

2. A process according to claim 1, in which the condition of the enclosed atmosphere which is controlled is the humidity thereof.

3. A process according to claim 1, in which the condition of the enclosed atmosphere which is controlled is the temperature thereof.

4. A process according to claim 1 in which the control of the flow of the fluid during the high temperature thereof is in response to the pressure of said fluid within the heat exchange member.

5. Apparatus for controlling an atmospheric condition within an enclosed space, embodying a mechanical refrigeration system including an evaporator, a condenser, a compressor joined between the outlet of said evaporator and the inlet of said compressor, a receiver, a first conduit including an expansion valve joined between said receiver and the inlet end of said evaporator, a valve disposed in said fluid conduit between said receiver and said expansion valve, a second conduit forming a hot gas by-pass between the discharge end of said compressor and said evaporator, a valve in said second conduit, and a pressure responsive means operably connected to the first fluid conduit between the expansion valve and the first named valve and operably connected to said valve in said second conduit for controlling the actuation thereof in response to the fluid pressure within said first conduit.

References Cited
UNITED STATES PATENTS

| | | | |
|---|---|---|---|
| 2,992,541 | 7/1961 | Sutton | 62—117 |
| 3,219,102 | 11/1965 | Taylor | 165—2 |
| 3,332,251 | 7/1967 | Watkins | 62—197 X |
| 3,350,895 | 11/1967 | Harnish | 62—197 |
| 3,358,923 | 12/1967 | Stedman | 236—46 |

ROBERT A. O'LEARY, Primary Examiner

ALBERT W. DAVIS, Assistant Examiner

U.S. Cl. X.R.

62—174, 197; 165—2, 31